(12) United States Patent
Sakata et al.

(10) Patent No.: US 8,385,851 B2
(45) Date of Patent: Feb. 26, 2013

(54) RADIO COMMUNICATION METHOD, RADIO TRANSMISSION APPARATUS AND RECEIVING APPARATUS

(75) Inventors: Ren Sakata, Yokohama (JP); Koji Akita, Yokohama (JP); Koichiro Ban, Kawasaki (JP); Noritaka Deguchi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1555 days.

(21) Appl. No.: 11/854,070

(22) Filed: Sep. 12, 2007

(65) Prior Publication Data

US 2008/0227389 A1    Sep. 18, 2008

(30) Foreign Application Priority Data

Mar. 15, 2007    (JP) ................................ 2007-067172

(51) Int. Cl.
H03C 7/02    (2006.01)
(52) U.S. Cl. ............ 455/101; 455/102; 455/82; 455/83; 455/19; 455/550.1; 455/562.1; 455/110; 455/137; 375/267; 375/299; 375/347
(58) Field of Classification Search .......... 455/101, 455/137, 139, 140, 143, 276.1, 304, 39, 102, 455/19, 83, 82, 550.1, 562.1, 110; 375/267, 375/347, 147, 259, 349, 260, 299
See application file for complete search history.

(56) References Cited

U.S. PATENT DOCUMENTS

| | | | | |
|---|---|---|---|---|
| 5,859,870 A * | 1/1999 | Tsujimoto | ..................... | 375/143 |
| 6,816,557 B2 * | 11/2004 | Kuchi et al. | .................... | 375/299 |
| 7,020,072 B1 * | 3/2006 | Li et al. | ......................... | 370/208 |
| 7,366,243 B1 * | 4/2008 | McCrady | ...................... | 375/259 |
| 7,643,568 B2 * | 1/2010 | Alamouti et al. | ............. | 375/267 |
| 7,653,141 B2 * | 1/2010 | Mo et al. | ........................ | 375/260 |
| 7,738,418 B2 * | 6/2010 | Kwon et al. | .................. | 370/328 |
| 2002/0141520 A1 * | 10/2002 | Nigrin et al. | .................. | 375/347 |
| 2003/0152174 A1 * | 8/2003 | Burke | ........................... | 375/349 |
| 2004/0234003 A1 * | 11/2004 | Alamouti et al. | ............. | 375/267 |
| 2006/0030279 A1 * | 2/2006 | Leabman | ...................... | 455/101 |
| 2006/0223587 A1 * | 10/2006 | Fernandez-Corbaton et al. | .......................... | 455/562.1 |
| 2007/0071071 A1 * | 3/2007 | Li et al. | ......................... | 375/147 |
| 2008/0019467 A1 * | 1/2008 | He | ................................. | 375/347 |
| 2010/0034165 A1 * | 2/2010 | Han et al. | ..................... | 370/330 |

FOREIGN PATENT DOCUMENTS

WO    WO 2005/054975 A2    6/2005
WO    WO 2006/105298 A1    10/2006

OTHER PUBLICATIONS

U.S. Appl. No. 12/049,708, filed Mar. 17, 2008, Sakata.
"Repetition of ACK/NACK in E-UTRA Uplink", 3GPP TSG RAN WG1 Meeting # 47bis, R1-070101, Sorrento, Italy, Jan. 15-19, 2007, 6 pages.

* cited by examiner

*Primary Examiner* — Junpeng Chen
(74) *Attorney, Agent, or Firm* — Oblon, Spivak, McClelland, Maier & Neustadt, L.L.P.

(57) ABSTRACT

A radio communication method includes generating a first transmit RF signal and a second transmit RF signal from a data signal to be transmitted. Each of the first and second transmit RF signals have a power spectrum in symmetric shape in the frequency domain. The first transmit RF signal and the second transmit RF signal are transmitted at a different time. The first transmit RF signal and the second transmit RF signal are received to generate a first received RF signal and a second received RF signal. The data signal from the first received RF signal and the second received RF signal are reproduced.

13 Claims, 9 Drawing Sheets

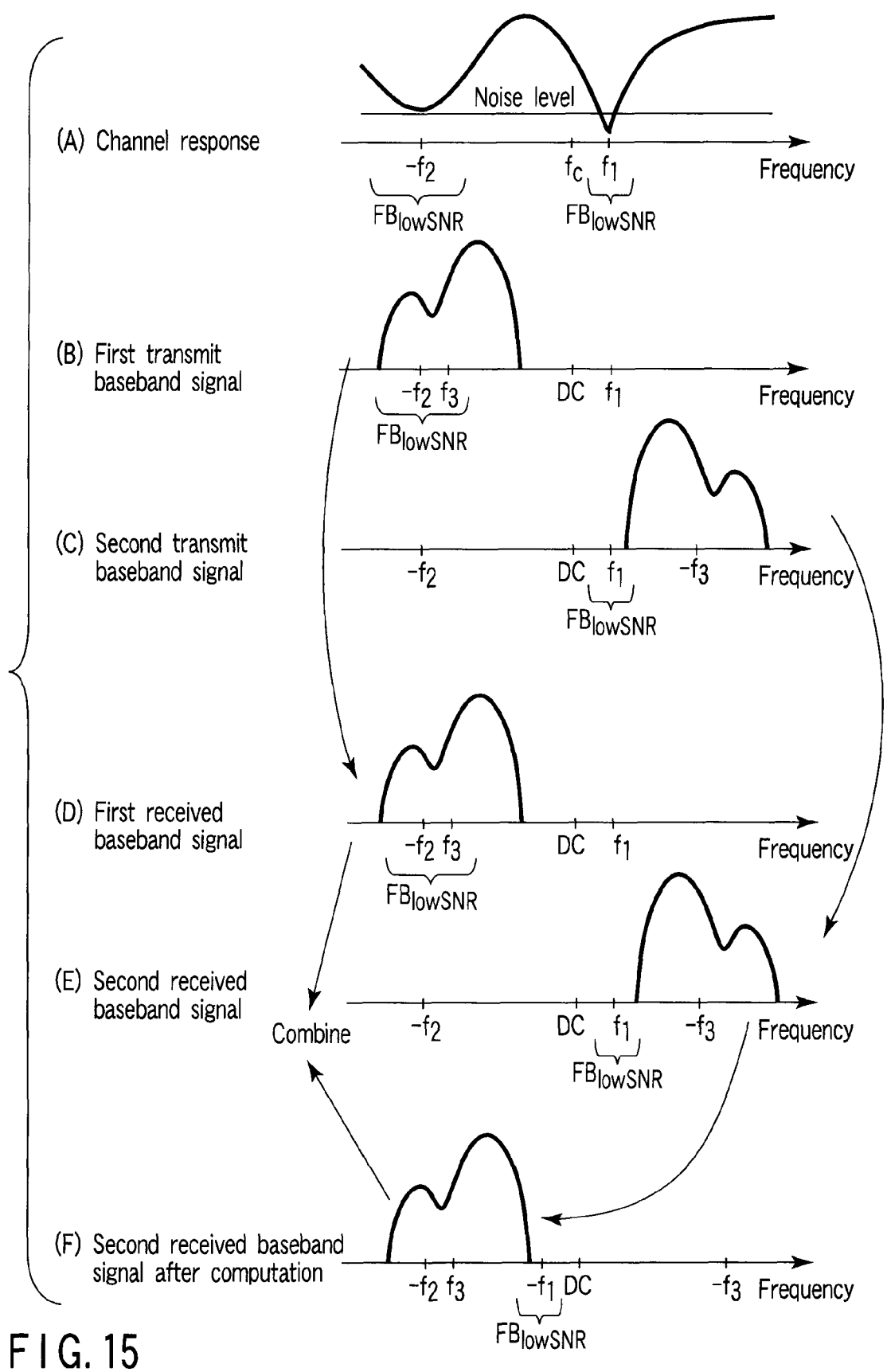
F I G. 15

RADIO COMMUNICATION METHOD, RADIO TRANSMISSION APPARATUS AND RECEIVING APPARATUS

CROSS-REFERENCE TO RELATED APPLICATIONS

This application is based upon and claims the benefit of priority from prior Japanese Patent Application No. 2007-067172, filed Mar. 15, 2007, the entire contents of which are incorporated herein by reference.

BACKGROUND OF THE INVENTION

1. Field of the Invention

The present invention relates to a radio communication method, a radio transmission apparatus and a radio receiving apparatus using time and frequency diversity.

2. Description of the Related Art

Conventionally, some diversity techniques have been put into practice in the field of radio communication. A diversity is a technique to transmit and receive a plurality of signals by using a plurality of radio communication resources and improve reception quality by choosing a received signal which is in good communication status at the receiving end, or by combining a plurality of received signals. As a type of diversity, there are a time diversity, in which identical signals are transmitted twice at different times, a frequency diversity, in which identical signals are transmitted by two different frequencies, an antenna diversity, in which the transmitted signals are received by two antennas arranged at different locations, or a path diversity, in which a plurality of delayed waves arriving at the antennas via different propagation paths (channels) are combined.

NTT DoCoMo, KDDI, Mitsubishi Electric, NEC, Panasonic and Sharp, "Repetition of ACK/NACK in E-UTRA Uplink", R1-070101, 3GPP TSG-RAN WG1 Meeting, #47bis (2007.01), (Document 1), disclose a technique combining time diversity and frequency diversity. In Document 1, as shown in FIG. 1, two transmit RF signals which have different center frequencies are generated from an identical data signal (ACK/NACK signal in Document 1) and transmitted at different times. Since the two transmit RF signals have different center frequencies, even in the case where they are transmitted via a channel having frequency selectivity likewise a multipath channel, there will be less possibility that both transmit RF signals will concurrently pass through a frequency band with large power attenuation (frequency diversity). In addition, because the transmitting time of the two transmit RF signals is different, the peak power can be prevented from increasing, which is caused by the transmit RF signals becoming multicarrier signals, and the two transmit RF signals can also be prevented from being transmitted concurrently during a time zone with large power attenuation (time diversity).

However, in the method described in Document 1, frequency conversion must be performed twice in order to transmit the same data signal in different frequencies and at different times. In the frequency conversion, for example, it is necessary to carry out the following processes; (a) generate sinusoidal signals, (b) multiply a transmit baseband signal obtained by modulating the data signal by the sinusoidal signal, and (c) filter the multiplied signal. In the method of Document 1, these processes are performed twice, by using sinusoidal signals having different frequencies.

Generally, the process of this type of frequency conversion requires an increase in calculation amount in accordance with the signal length of the data signal. In the case of a digital signal process, the number of times of multiplication is required in proportion to the signal length. Accordingly, it is not favorable for mobile appliances requiring downsizing, lightness and low power consumption to carry out the frequency conversion process twice, since this leads to increased power consumption and circuit size.

BRIEF SUMMARY OF THE INVENTION

According to an embodiment of the present invention, there is provided a radio communication method comprising, generating a first transmit RF signal and a second transmit RF signal from a data signal to be transmitted, each of the first and second transmit RF signals having a power spectrum in symmetric shape in the frequency domain, transmitting the first transmit RF signal and the second transmit RF signal at a different time, receiving the first transmit RF signal and the second transmit RF signal to generate a first received RF signal and a second received RF signal, and reproducing the data signal from the first received RF signal and the second received RF signal.

BRIEF DESCRIPTION OF THE SEVERAL VIEWS OF THE DRAWINGS

FIG. 15 illustrates a frequency characteristic for each unit in the second embodiment.

DETAILED DESCRIPTION OF THE INVENTION

Embodiments of the present invention will be explained in detail with reference to the drawings as follows.

(Radio Communication System)

Figure 1:
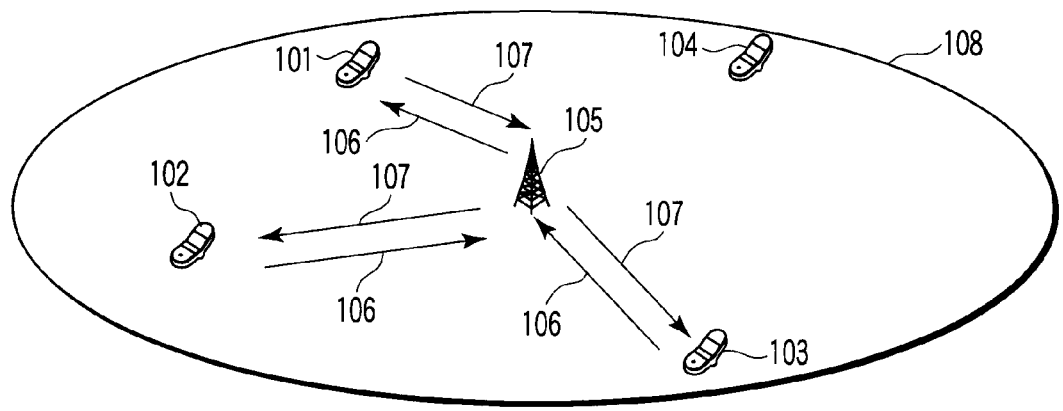
FIG. 1 is a schematic view of a radio communication system including a base station and terminals.

As illustrated in FIG. 1, a radio communication system according to a first embodiment of the present invention comprises a plurality of mobile terminals, such as terminals 101 to 104, and a base station 105. Terminals 101 to 104 are located within a cover area 108 of the base station 105. Here, there are four terminals 101 to 104 and one base station 105. However, this is not restricted. Therefore, for instance, there may be one terminal and a plurality of base stations. A downlink 106 is used when communicating from the base station 105 to the terminals 101 to 104, and an uplink 107 is used when communicating from the terminals 101 to 104 to the base station 105.

Figure 2:
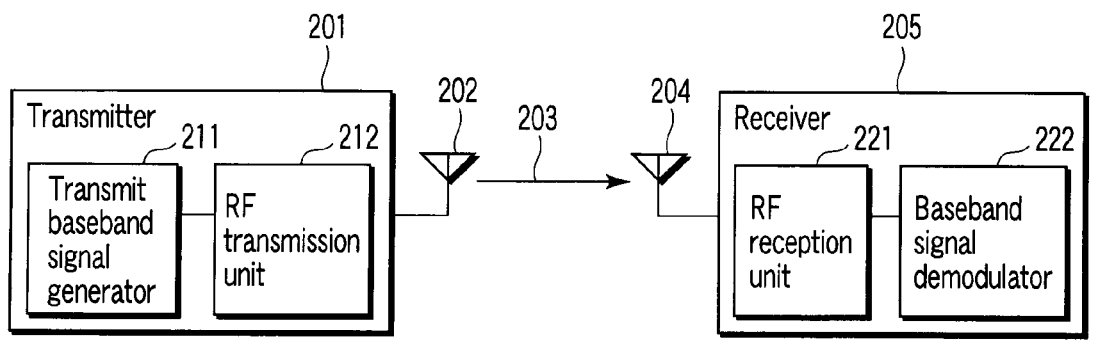
FIG. 2 is a block diagram illustrating a transmission and reception system provided in the base station and the terminals.

As illustrated in FIG. 2, in the downlink 106 process, the transmit RF signal is transmitted via a transmit antenna 202 from a transmitter 201, which is provided on the base station 105. In the transmitter 201, a transmit baseband signal generator 211 generates a transmit baseband signal from a data signal. The transmit baseband signal is input to an RF transmission unit 212 and subject to an RF process. The RF process carried out by the RF transmission unit 212 includes a process of upconverting the transmit baseband signal into an RF frequency, and a process of subjecting such upconverted signal to power amplification. In some cases, the RF process further includes a filter process. The RF transmit signal is generated by such RF process carried out by the RF transmission unit 212.

The transmit RF signal arrives at a receive antenna 204, which is provided on the terminals 101 to 104, via a channel (propagation path) 203, and a received RF signal is output from the receive antenna 204. The received RF signal is input to the receiver 205, and is subject to the RF process by an RF reception unit 221. The RF process carried out by the RF reception unit 221 includes a process of amplifying the received RF signal and a process of downconverting such amplified received RF signal into a baseband frequency. In some cases, the RF process further includes a filter process. A received baseband signal is generated by this type of process carried out by the RF reception unit. The received baseband signal is further demodulated by a baseband signal demodulator 222, thereby reproducing a transmit data signal.

Meanwhile, in the process of the uplink 107, a signal is transmitted from the transmitter 201, which is provided on the terminals 101 to 104, via the transmit antenna 202. The signal arrives at the receive antenna 204, which is provided on the base station 105, via the channel 203 and is input to the receiver 205. The processes carried out by the transmitter 201 and the receiver 205 in the uplink 107 are the same as those carried out in the downlink 106.

Figure 3:
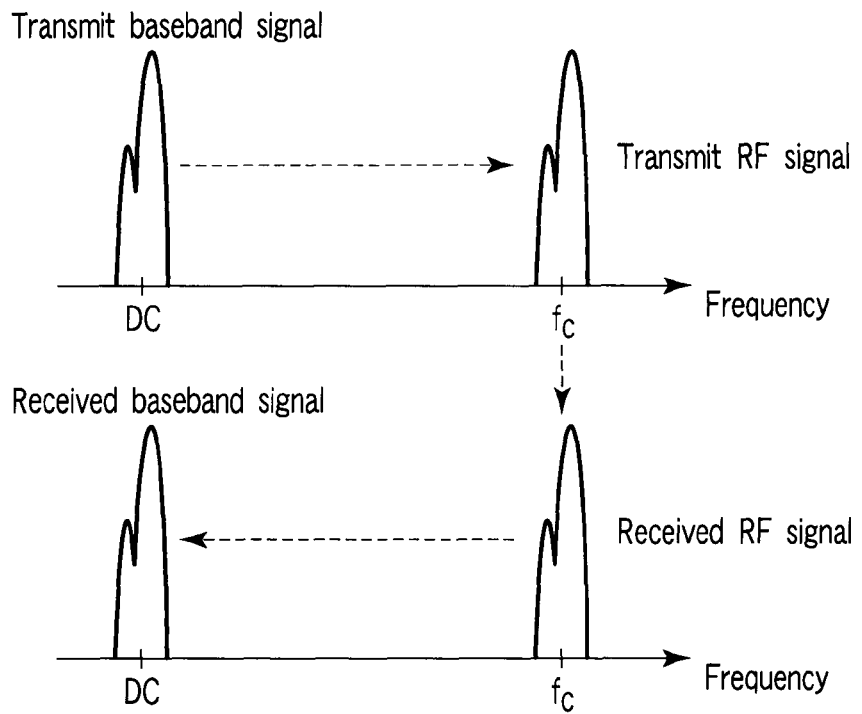
FIG. 3 illustrates an example of frequency relations between a transmit and received baseband signal and a transmit and received RF signal.
Figure 4:
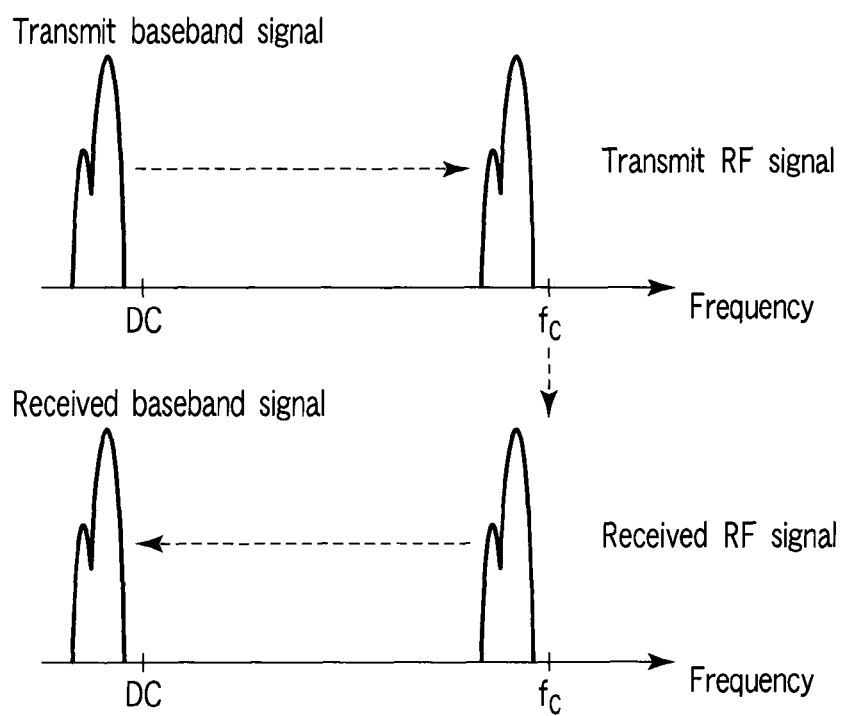
FIG. 4 illustrates another example of frequency relations between the transmit baseband signal and received baseband signal and the transmit and received RF signal.

Frequency relations between the transmit and received baseband signals and the transmit and received RF signals may be either one of FIGS. 3 and 4. According to FIG. 3, the center frequency of the transmit baseband signal and the received baseband signal is DC, and the center frequency of the transmit RF signal and received RF signal is a carrier frequency $f_c$. In contrast, in FIG. 4, the center frequency of the transmit baseband signal and received baseband signal is not DC, and the carrier frequency $f_c$ is not the center frequency of the transmit RF signal and the received RF signal.

Figure 5:
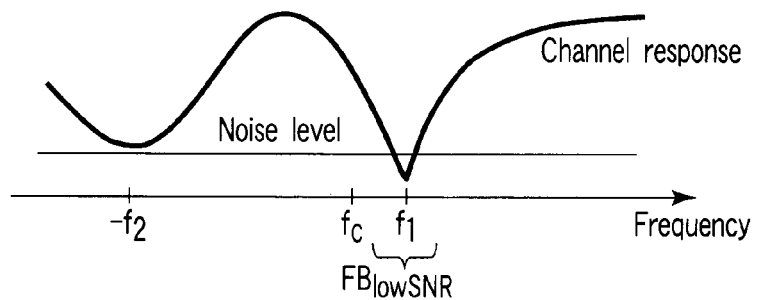
FIG. 5 illustrates an example of a channel response.

FIG. 5 shows an example of a frequency characteristic of an impulse response (referred to as a channel response) possessed by the channel 203. Generally, the channel 203 is mostly a multipath channel. In the multipath channel, frequencies which strengthen, or, instead, weaken each other's signal power occur between each of the channels. In the example of FIG. 3, significant power reduction occurs in the frequency band near frequencies $f_1$ and $-f_2$. Such characteristic of the multipath channel is called frequency selectivity.

In frequency band where a power reduction is caused by such frequency selectivity, it is relatively susceptible to noise when the received power becomes low. Therefore, the signal to noise ratio (SNR) deteriorates. Here, a frequency band which undergoes reduction in received power is referred to as $FB_{lowSNR}$. In the case where the transmit RF signal is a narrow band signal, the possibility of receiving error increases when transmitting the signal by the frequency band $FB_{lowSNR}$. Generally, by widening the bandwidth of the transmit RF signal, the entire bandwidth of the transmit RF signal can be prevented from merging into the frequency band $FB_{lowSNR}$, thereby, averting receiving error.

Figure 6:
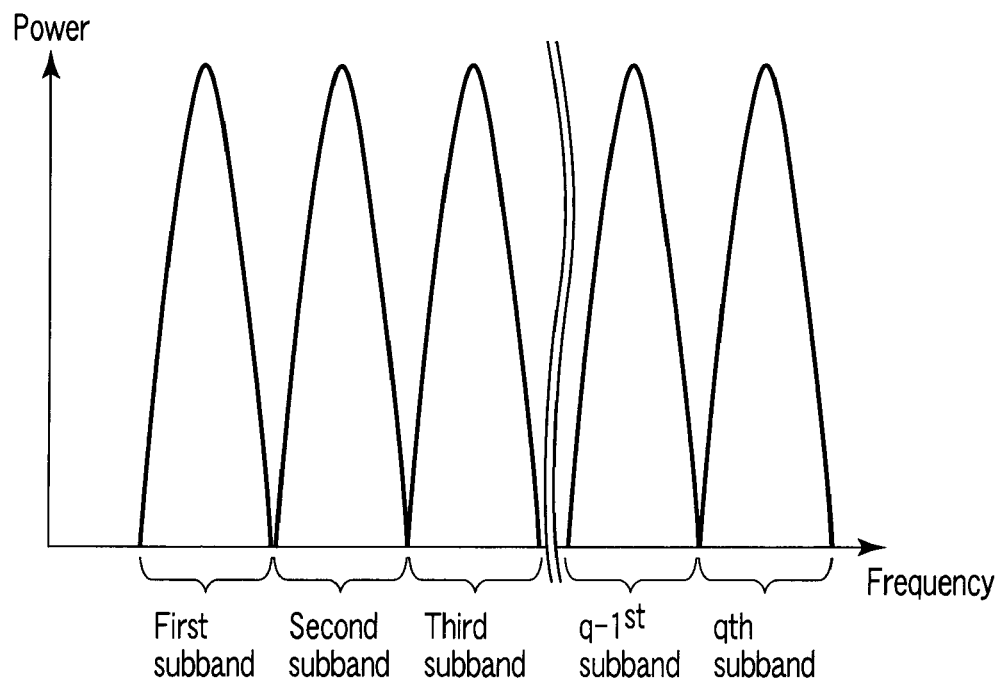
FIG. 6 illustrates an example of a frequency arrangement of subbands in an FDMA communication.

The frequency bandwidth the transmitter 201 uses for transmission, or the transmittable frequency bandwidth, is assumed as being divided into q pieces of subbands as illustrated in FIG. 6. Here, the subbands are referred to as the first subband to the qth subband in the order of frequency from low to high. The transmitter 201 is assumed as transmitting a signal using one subband. It depends on the instruction from the transmitter 201 or receiver 205 as to which subband will be used upon transmission. By forming a plurality of subbands in this manner, a frequency division multiplexing (FDM) communication in which a plurality of transmit RF signals are transmitted simultaneously can be realized.

Meanwhile, the receiver 205 is assumed to receive the signal transmitted using any one of the subbands from the transmitter 201. The number of subbands and the frequency bandwidth of a subband need not necessarily be fixed. For example, the number of subbands and the subband frequency bandwidth may be varied in accordance with the transmission rate required upon transmission and the number of transmitters and receivers communicating simultaneously.

Figure 7:
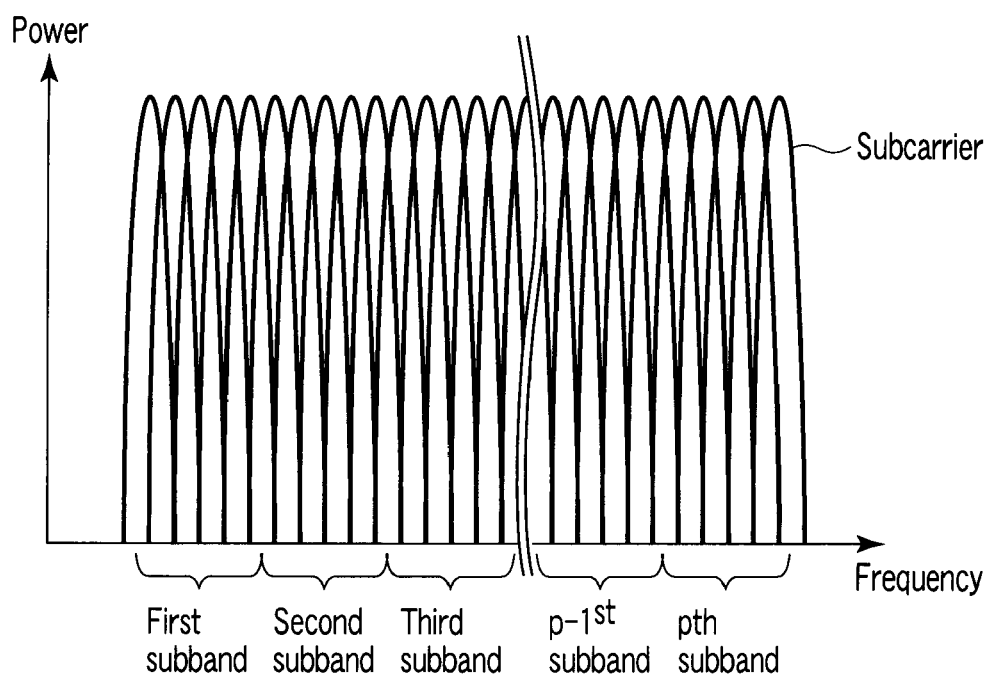
FIG. 7 illustrates an example of a frequency arrangement of subbands and subcarriers in an OFDMA communication.

As a particular case of FDM communication, there is an Orthogonal Frequency Division Multiple Access (OFDMA) communication. FIG. 7 shows the usage of frequency in the OFDMA communication. Likewise FIG. 6, the frequency band to be used is divided into p pieces of subbands. However, it is different from FIG. 6 in that one subband includes a plurality of subcarriers. Each of the subcarriers is arranged so that they are mutually orthogonal in the frequency domain. In other words, each of the subcarriers is arranged so as not to interfere with the other subcarriers. In the present embodiment, even such OFDMA communication is applicable by considering a plurality of subcarriers as one subband.

According to the present embodiment, a plurality of transmit RF signals are generated from a same data signal in the transmitter 201. These transmit RF signals are transmitted at different times via the transmit antenna 202 and the channel 203. The plurality of transmit RF signals transmitted via the channel 203 are received by the receiver via the receive antenna 204.

Figure 8:
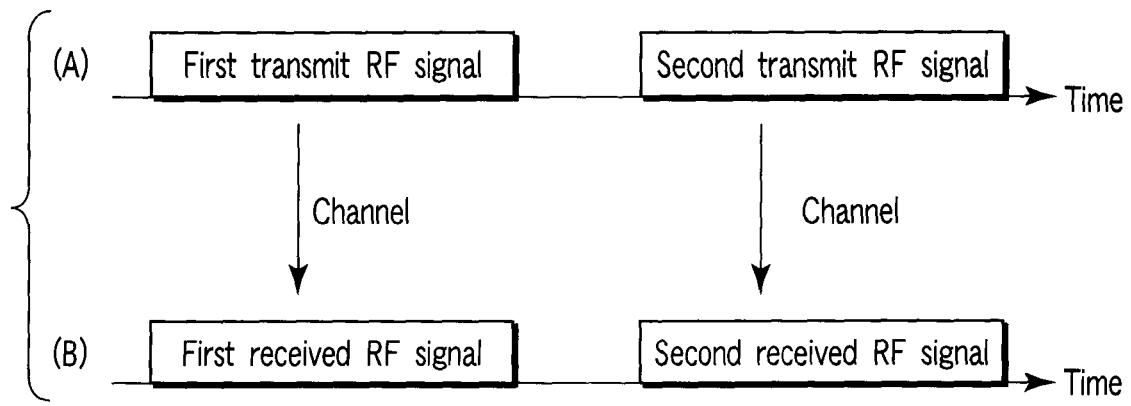
FIG. 8 illustrates relations between a plurality of transmit RF signals and a plurality of received RF signals.

According to the example of FIG. 8 (A), two transmit RF signals (first and second transmit RF signals) are transmitted at different transmitting times from the transmitter 201. In other words, first, the first transmit RF signal is transmitted, then, the second transmit RF signal is transmitted. The first transmit RF signal and the second transmit RF signal are received by the receiver 205 via the channel 203 as illustrated in FIG. 8 (B), thereby obtaining a first received RF signal and a second received RF signal.

Here, when the transmitting time is different, it means that the time to start transmission or the time to end transmission of the first transmit RF signal and the second transmit RF signal is different. Accordingly, the first transmit RF signal and the second transmit RF signal may partially overlap, or may not overlap at all on the time axis. In a situation using FDM communication, the first transmit RF signal and the second transmit RF signal each use a different subband so that they are transmitted in a state where each transmit RF signal partially overlaps each other. In this case, either the transmission starting time or the transmission ending time needs to be different.

In the present embodiment, in order to realize time diversity, the first transmit RF signal and the second transmit RF signal are used and are transmitted at different times. The anteriorly transmitted first transmit RF signal and the subsequently transmitted second transmit RF signal are generated from a transmit baseband signal which is obtained by modulating the same data signal. If a modulation scheme and an error-correcting encoding scheme are identical, the first and second transmit RF signals will have a same time wave.

In this manner, the possibility of a receiving error can be reduced by transmitting the transmit RF signals having the same time wave twice from the transmitter 201, and by the receiver 205 receiving the two transmit RF signals. The receiver may select and demodulate one of the two received RF signals, which is assumed to have been received with more accuracy, or may demodulate both signals after combining them. By such method, it is possible to reduce a reception error. The transmitter 201 and receiver 205 will be explained in detail as follows.

Transmitter of the First Embodiment

Figure 9:
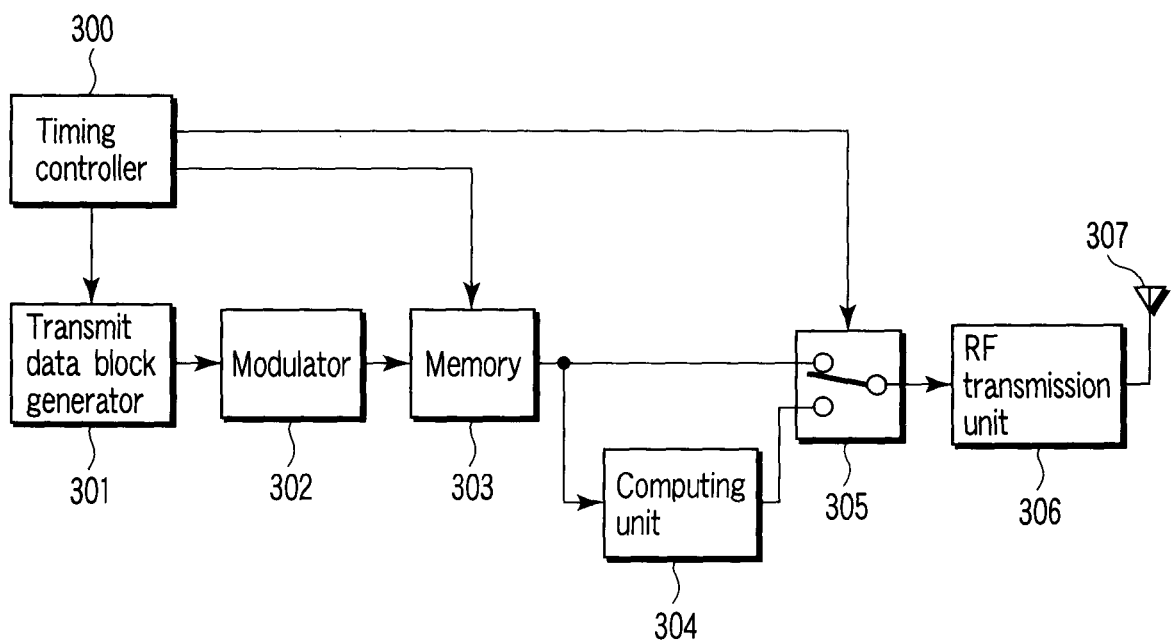
FIG. 9 is a block diagram illustrating a transmitter according to a first embodiment.

The transmitter 201 according to the first embodiment will be explained with reference to FIG. 9. As illustrated in FIG. 9, the transmitter 201 comprises a timing controller 300, a transmit data block generator 301, a modulator 302, a memory 303, a computing unit 304, an RF transmission signal selector 305 and an RF transmission unit 306. The RF transmission unit 306 corresponds to the RF transmission unit 212 in FIG. 2, and is connected to a transmit antenna 307, which corresponds to the transmit antenna 202 in FIG. 2. The transmit data block generator 301, the modulator 302, the memory 303 and the computing unit 304 correspond to the transmit baseband signal generator 211 in FIG. 2.

The transmit data block generator 301 generates a transmit data block (a data block to be transmitted, also referred hereinafter as transmit data signal) by cutting out data in constant length from the error-correcting encoded data. The transmit data signal is, for example, ACK (Acknowledge)/NACK (Non-Acknowledge)/CQI (channel Quality Indicator) signals, though it is not restricted to these signals. The generated transmit data signal is input to the modulator 302 in accordance with the instruction from the timing controller 300.

The modulator 302 modulates the transmit data signal input from the transmit data block generator 301, thereby generating a transmit baseband signal (a first transmit baseband signal), which is a modulated signal. In the modulator 302, various digital modulation schemes which are known conventionally are used. Such modulation schemes are, for example, BPSK (Binary Phase Shift Keying), QPSK (Quadrature Phase Shift Keying), ASK (Amplitude Shift Keying), FSK (Frequency Shift Keying), 16QAM (16 Quadrature Amplitude Modulation), 64QAM, or OFDM (Orthogonal Frequency Division Multipexing).

In the present embodiment, since it is necessary for the transmitter 201 to transmit the same transmit data signal twice, the transmit baseband signal (the first transmit baseband signal) obtained by the modulator 302 is stored in the memory 303. The transmit baseband signal stored in memory 303 can be read out as needed, and the contents stored in the memory 303 can be retained until the modulator 302 inputs a new transmit baseband signal. The transmit baseband signal stored in the memory 303 is read out at a timing given by the timing controller 300, and is transmitted to the computing unit 304 and the RF transmission signal selector 305.

In the computing unit 304, the transmit baseband signal read out from the memory 303 is calculated by a computation predetermined between the transmitter 201 and the receiver 205. The computation method will be explained in detail later on. The transmit baseband signal computed by the computing unit 304 (a second transmit baseband signal) is transmitted to the RF transmission signal selector 305.

The RF transmit signal selector 305 selects either one of the transmit baseband signal read out from the memory 303 in accordance with the instruction from the timing controller 300, or the calculated baseband signal output from the computing unit 304. The selected baseband signal is input to the RF transmission unit 306.

In the RF transmission unit 306, the transmit baseband signal selected by the RF transmission signal selector 305 is subject to frequency conversion and converted into an RF frequency, thereby generating the transmit RF signal. In other words, in the RF transmission unit 306, a first transmit RF signal corresponding to the transmit baseband signal (the first transmit baseband signal) read out from the memory 303 is generated, and a second transmit RF signal corresponding to the computed transmit baseband signal (the second transmit baseband signal) read out from the computing unit 304 is generated.

Here, in the computing unit 304, a computation which makes the first and second transmit RF signals form a symmetric power spectrum in the frequency domain is applied on the first transmit baseband signal to generate the second transmit baseband signal. In the RF transmission unit 306, the first and second transmit RF signals are further subject to power amplification and supplied to the transmit antenna 307. The first and second transmit RF signals output from the RF transmission unit 306 are transmitted as a radio wave by the transmit antenna 307.

The timing controller 300 controls the timing of each unit as follows. First of all, the timing controller 300 instructs the transmit data block generator 301 the timing to generate the transmit data block. In the present embodiment, since the first and second transmit RF signals are transmitted for one transmit data block, the terminal controller 300 controls the output of the next transmit data block to wait until the transmission of the second transmit RF signal terminates so that the content of the memory 303 remains unchanged until the generation of the first and second transmit RF signals is terminated.

The timing controller 300 instructs the memory 303 to perform a read operation of the baseband signal stored therein, each time the first and second transmit RF signals are transmitted. Further, the timing controller 300 instructs the RF transmission signal selector 305 to select the first transmit baseband signal which is read out from the memory 303 when it is the transmitting time of the first transmit RF signal, and to select the calculated second transmit baseband signal which is output from the computing unit 304 when it is the transmitting time of the second transmit RF signal.

Receiver of the First Embodiment

Figure 10:
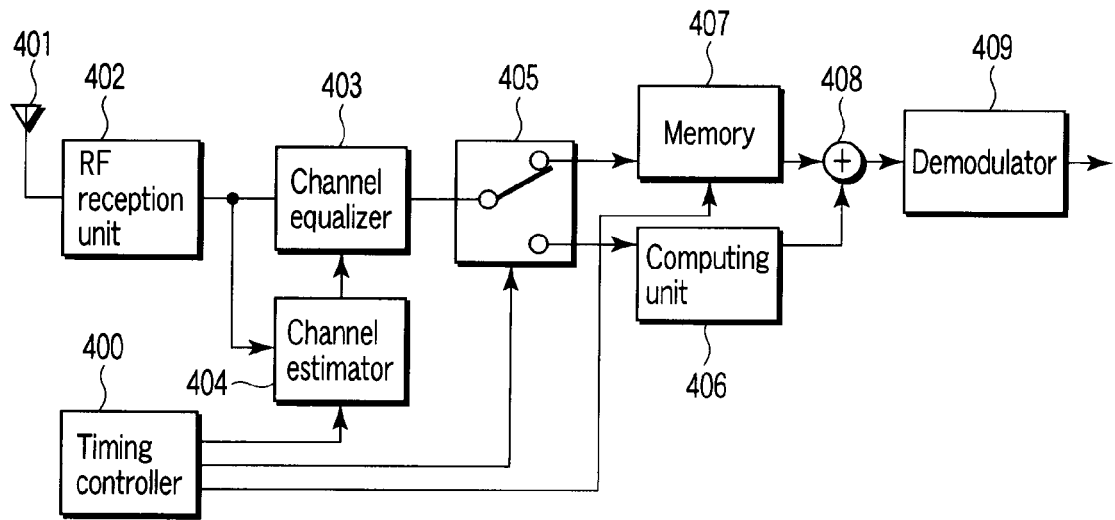
FIG. 10 is a block diagram illustrating a receiver according to the first embodiment.

The receiver 205 according to the first embodiment will explained with reference to FIG. 10. As illustrated in FIG. 10, the receiver 205 comprises a timing controller 400, an RF reception unit 402, a channel equalizer 403, a channel estimator 404, a selector 405, a computing unit 406, a memory 407, a combiner 408 and a demodulator 409. The RF reception unit 402 corresponds to the RF reception unit 221 in FIG. 2, which is connected to a receive antenna 401 corresponding to the receive antenna 204 in FIG. 2.

The receive antenna 401 receives the first and second transmit RF signals transmitted from the transmitter 201 in FIG. 9, and outputs the first and second received RF signals which correspond respectively to the first and second transmit RF signals. The first and second received RF signals are input to the RF reception unit 402. In the RF reception unit 402, the first and second received baseband signals are generated by converting the first and second received RF signals into a baseband frequency after they are amplified. The first and second received baseband signals are transmitted to the channel estimator 404 and the channel equalizer 403.

In the channel estimator 404, a channel response, or, in other words, a channel distortion (the distortion undergone by the transmit RF signal in the channel) is estimated by using the first and second received baseband signal. The distortion here indicates the change of received power and phase rotation. As a well-known general method of estimating channel distortion, there is a method in which the transmitter transmits a known signal (referred to as a pilot signal) predetermined between the transmitter and the receiver. The transmitter 201 illustrated in FIG. 2 is also considered as transmitting such pilot signal.

The pilot signal transmitted from the transmitter 201 is subject to distortion on the channel 203 likewise the data signal. In the receiver 205, by comparing the transmit pilot signal and the received pilot signal, the change of received power and the phase rotation for each frequency can be estimated. The information indicative of the channel response (channel distortion) estimated in such manner is transmitted from the channel estimator 404 to the channel equalizer 403.

In the channel equalizer 403, the first and second received baseband signals output from the RF reception unit 402 are subject to a process which suppresses channel distortion (this is called channel equalization), and the equalized first and second baseband signals are output. Among some of the known channel equalization methods, a method in which the channel distortion is suppressed by multiplying the received RF signal by an inverse characteristic of the channel response is commonly used. In other words, during transmission, in the case where the transmit RF signal has become weaker, the received RF signal is amplified, whereas, in the case where the transmit RF signal has become stronger, the received RF signal is attenuated. Meanwhile, in the case where the transmit RF signal undergoes a phase rotation during transmission, a phase rotation in an inverse direction is multiplied.

In the channel equalizer 403, the channel distortion is suppressed by the above process, and the wave pattern of the transmit RF signal is reproduced. However, since the channel estimation result has an error caused by, such as, noise, and an error caused by calculation also occurs in the channel equalization, it is difficult to reproduce the wave pattern of the transmit RF signal completely. These errors increase as the SNR of the received RF signal becomes lower. In a multipath channel, since the channel response has frequency characteristics, the extent of error differs depending on the frequency of the received RF signal. In other words, large portions and small portions of errors both exist within the spectrum of the received RF signal. This becomes the cause of error upon demodulation.

The equalized first and second baseband signals output from the channel equalizer 403 are transmitted to the selector 405. The selector 405 guides the input equalized baseband signal to either the computing unit 406 or the memory 407 in accordance with the instruction from the timing controller 400. In the computing unit 406, the equalized baseband signal from the selector 405 is subject to an inverse computation of the computation performed by the computing unit 304 within the transmitter 201 in FIG. 9.

The signal having undergone computation by the computing unit 406 is input to the combiner 408. In the combiner 408, the signal read out from the memory 407 and the signal output from the computing unit 406 are combined. The demodulator 409 demodulates the signal (combined baseband signal) output from the combiner 408, by the demodulation corresponding to the modulation applied by the modulator 302 within the transmitter 201 in FIG. 7. As a result, the original transmit data is reproduced by the demodulator 409.

The timing controller 400 gives processing instructions to the channel equalizer 403, the channel estimator 404, the selector 405, the memory 407 and the combiner 408 based on the receiving time of the first and second transmit RF signals. In other words, the timing controller 400 instructs the channel estimator 404 to perform an estimation operation at the time the pilot signal is transmitted from the transmitter 201.

The timing controller 400 gives the selector 405, for example, a selection control signal of one bit, which indicates whether the received RF signal is the first received RF signal or the second received RF signal. As a result, in the case where the received RF signal is the first received RF signal, the received RF signal selector 405 inputs the first equalized baseband signal corresponding to the first received RF signal to the memory 407. In the case where the received RF signal is the second received RF signal, the received RF signal selector 405 inputs the second equalized baseband signal corresponding to the second received RF signal to the computing unit 406.

In the case where the received RF signal is the first received RF signal, the timing controller 400 commands the memory 407 to store the first equalized baseband signal which corresponds to the first received RF signal. The timing controller 400 also notifies the combiner 408 whether the received RF signal is the first received RF signal or the second received RF signal. As a result, in the case where the received RF signal is the first received RF signal, the combiner 408 waits for the second equalized baseband signal which corresponds to the subsequent second received RF signal. In the case where the received RF signal is the second received RF signal, the combiner 408 combines the first equalized baseband signal being read out from the memory 407 with the second equalized baseband signal. Such receiving process can remove the computation influence on the second transmit baseband signal received at the transmission side.

According to the present embodiment, the first transmit RF signal is generated from the first transmit baseband signal by the transmitter 201, and the second transmit RF signal is generated from the second transmit baseband signal which is obtained by subjecting the first transmit baseband signal to computation by the computing unit 304. Consequently, the first and second transmit RF signals can have different time waves without changing the features of the modulator 302. Therefore, the shapes of the power spectrum of the first and second transmit RF signals can be made different. Accordingly, even if the channel 203 is a multipath channel and the first and second transmit RF signals are caught with the same frequency selectivity on the channel 203, the influence undergone by the first and second received RF signals on the channel 203 is different from each other.

Meanwhile, in the case where the first and second received RF signals have undergone different influences on the channel 203 as mentioned above, in the receiver 205, such influence is propagated also to the equalized first and second baseband signals. Here, an inverse computation which is a computation applied to the second transmit baseband signal by the computing unit 304 in the transmitter 201 is applied to the second equalized baseband signal by the computing unit 406. Subsequently, the equalized first and second baseband signals are combined by the combiner 408.

As a result, a component which gives larger influence on either the first and second received RF signals on the channel 203 can be complemented by the other first and second received RF signals. Accordingly, the possibility of an occurrence of reception error can be further reduced in addition to the time diversity effect, thereby improving the reception performance.

The computing units 304 and 406 will be explained specifically. In the computing unit 304, the first transmit baseband signal, which is the input signal, is subject to, for example, a complex conjugate computation (a first computation) to generate the second transmit baseband signal. The complex conjugate computation is, for example, a computation in which a symbol of a real part (a real number component) of a complex signal, which is the input signal, is inversed, or is multiplied by $-1$. By subjecting the input signal to such complex conjugate computation, the signal frequency can be transferred to an axisymmetric frequency with respect to a direct current.

Figure 11:
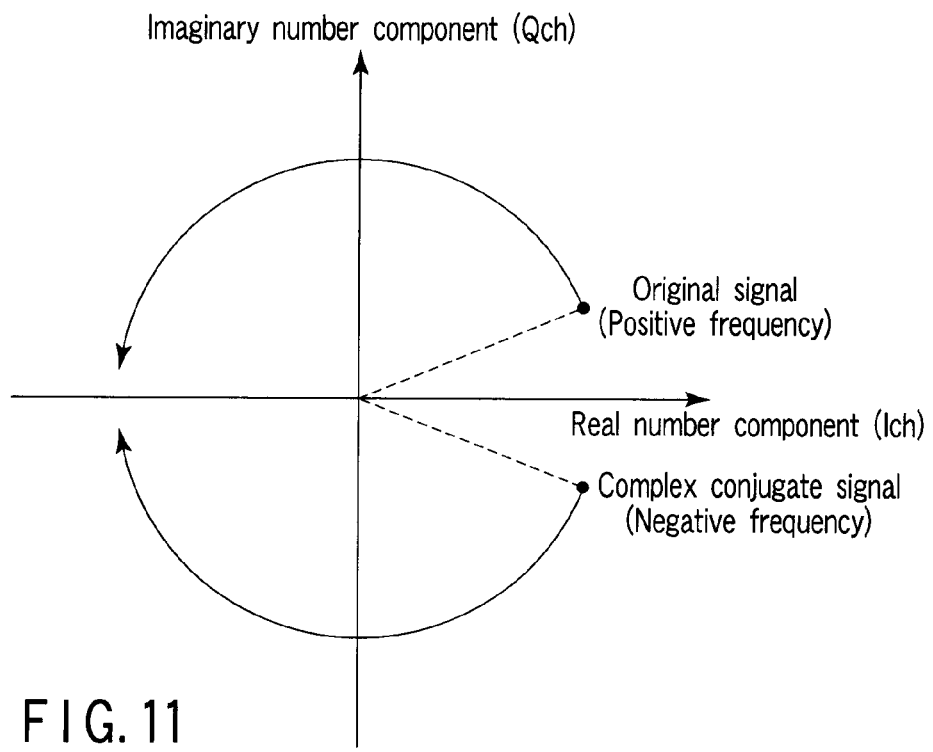
FIG. 11 is a diagram explaining a complex conjugate calculation used in a computing unit in FIGS. 9 and 10.

The principle is as shown in FIG. 11. For example, the signal of the positive frequency $f_0$, which is the input signal, is a signal rotating counterclockwise on the complex plane. When subjecting this signal to the complex conjugate computation, it is possible to generate an output signal which has the same rotation rate and has an inversed rotation direction. This means that a signal of frequency $-f_0$ can be generated by the complex conjugate computation.

The process according to the first embodiment will be explained using FIGS. 12 (A), (B), (C), (D), (E) and (F). The radio communication system in FIG. 1 communicates in the RF frequency. However, for convenience of explanation, in FIG. 12 (A) to (F), the frequency conversion from the baseband frequency into the RF frequency (upconvert) performed by the RF transmission unit 306, and the frequency conversion from the RF frequency into the baseband frequency (downconvert) performed by the RF reception unit 402 are omitted. Further, in the channel response of FIG. 12 (A), only the frequency band around the carrier frequency $f_c$ is shown. The carrier frequency $f_c$ corresponds to DC in the baseband signal. Furthermore, in FIG. 12 (A) to (F), $FB_{lowSNR}$ represents the frequency band of the low SNR, where the received power decreases as explained in FIG. 5.

Figure 12:
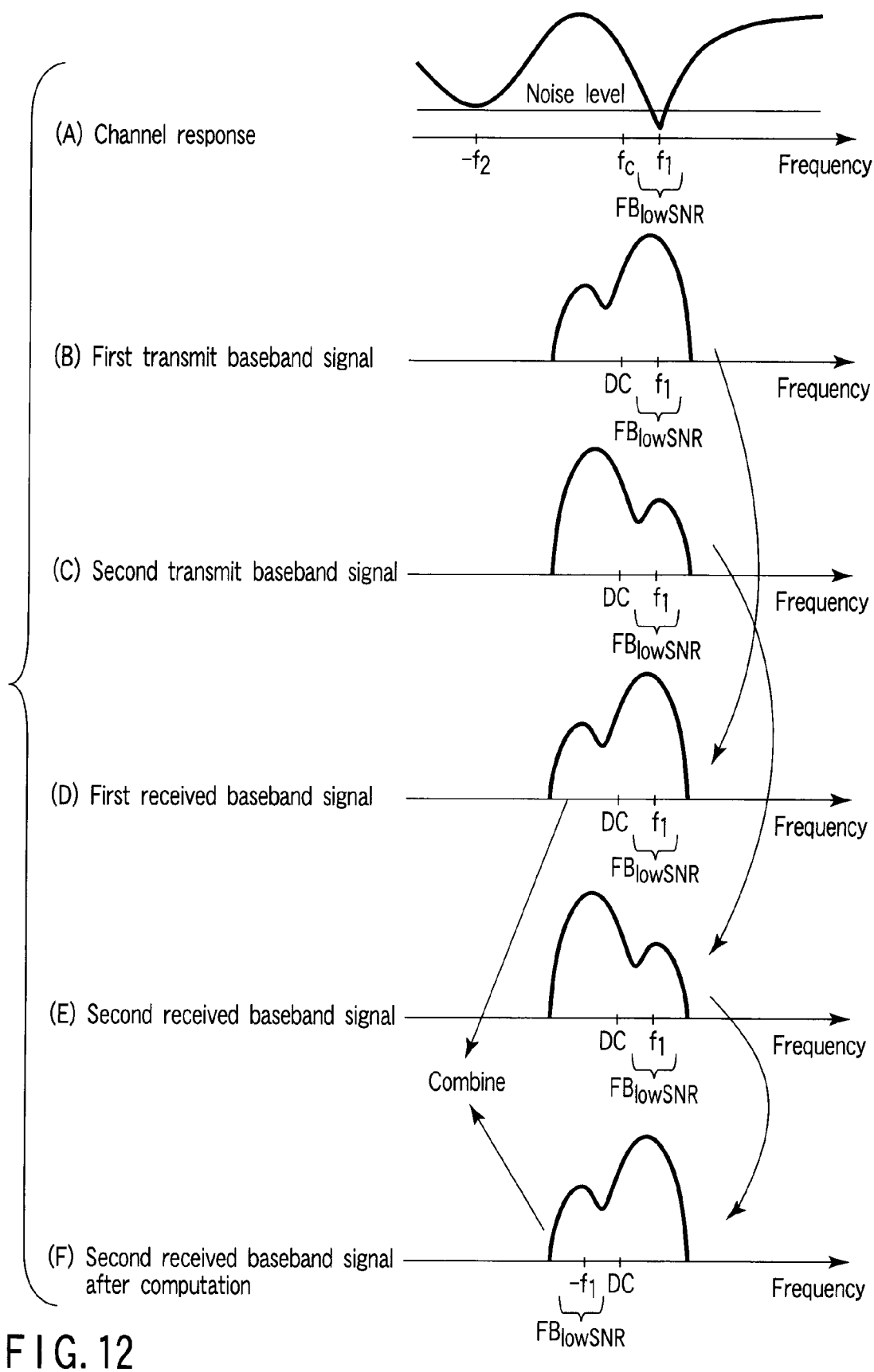
FIG. 12 illustrates a frequency characteristic for each unit in the first embodiment.

As shown in the channel response of FIG. 12 (A), it is assumed that the channel 203 has a characteristic in which the received power drops in frequencies of $f_c+f_1$ and $f_c-f_2$. In this case, the SNR of the RF signal of frequencies $f_c+f_1$ and $f_c-f_2$ (signals of frequency $f_1$ and $-f_2$ in the baseband) becomes lower. FIGS. 12 (B), (C), (D), (E) and (F) indicate the power spectrum of each baseband signal.

The spectrum of the first transmit baseband signal is shown in, for example, FIG. 12 (B). It is assumed that a part of the spectrum in the first transmit baseband signal includes a frequency $f_1$ component with low SNR. When a complex conjugate computation is applied to the first transmit baseband signal by the computing unit 304, the second transit RF signal having a spectrum shown in FIG. 12 (C) is obtained. As is obvious from FIGS. 12 (B) and (C), the first transmit baseband signal and the second transmit baseband signal become spectrums in axisymmetric shapes with respect to the frequency corresponding to DC in the frequency domain.

The first and second transmit baseband signals are transmitted respectively as the first and the second transmit RF signals from the transmitter 201 via the channel 203 at a different time. The first and second transmit RF signals are received by the receiver 205 via the channel 203 as the first and second received RF signals, and the first and second received baseband signals having the spectrums shown in FIGS. 12 (D) and (E) are generated. Here, among the first received baseband signals, the frequency $f_1$ component has a low SNR since the received power attenuates on the channel 203. Accordingly, although the spectrum shape can be amended in the channel equalization process, the component in the vicinity of frequency $f_1$ includes a lot of errors. In the case where a part of the spectrum includes errors, an error also occurs in the time wave. Therefore, it is obvious that an error is inclined to occur at the time of demodulation.

In the present embodiment, the second transmit baseband signal is a signal obtained by subjecting the first transmit baseband signal to the complex conjugate computation. For this reason, the second transmit baseband signal has an inversed spectrum with respect to the spectrum of the first transmit baseband signal. Therefore, the inversed spectrum may be reversed to the original state by subjecting the second received baseband signal which corresponds to the second transmit baseband signal to an inversed computation of the complex conjugate computation (a second computation) by the computing unit 406 in the receiver 204. Thus, the second received baseband signal having the spectrum shown in FIG. 12 (F) can be obtained. In this manner, among the second received baseband signals, the frequency $f_1$ component with a low SNR transfers to the frequency $-f_1$.

The inverse computation of the spectrum inversion is a spectrum inversion. The inverse computation of the complex conjugate computation is the complex conjugate computation itself. In other words, the computation performed in the computing unit 406 (the second computation) is equivalent to performing the computation performed in the transmitter (the first computation) for the second time. Among the first received baseband signals, the SNR of the frequency $f_1$ component is low, however, the SNR of the other frequency components is relatively high. As for the second received baseband signal after computation, the SNR of the frequency $-f_1$ part is low, however, the components of the other frequencies have a relatively high SNR. Accordingly, by combining the first received baseband signal and the computed second received baseband signal in the combiner 408, the first received baseband signal and the second received baseband signal can mutually complement the portion with low SNR. As a result, the possibility of an error occurring at the time of demodulation can be reduced.

In such manner, according to the first embodiment, the frequency diversity effect can be obtained in addition to the time diversity effect by making the spectrum of the first and second transmit RF signals, which are transmitted at a different time, form a symmetry in the frequency domain. In this case, it is only necessary to add the complex conjugate computation, which is a very simple computation, and has less calculation amount and significantly lower consumption power than the method disclosed in Document 1. Particularly, in the case where the first transmit baseband signal is a digital signal, in which the most significant bit (MSB) of the digital signal indicates a polarity and the rest of the bits indicate an absolute value, the complex conjugate computation can be realized by only inversing the MSB.

Here, the complex conjugate computation has been used as the computation performed by the computing units 304 and 406. However, it does not necessarily have to be a complex conjugate computation. The complex conjugate computation is a computation which inverses the symbol of an imaginary part. However, the same result can be obtained even by inversing a symbol of a real part instead. Further, the same result is obtained when the computing unit 304 performs a computation to replace the real part with the imaginary part of the transmit RF signal. In this case, the shape of spectrum can be restored by having the computing unit 406 in the receiver 205 perform the computation to replace the real part with the imaginary part of the received RF signal.

In the above manner, by a simple process which does not require performing the frequency conversion twice, it is possible to realize a highly reliable radio communication using both the frequency diversity and the time diversity.

Transmitter of a Second Embodiment

Figure 13:
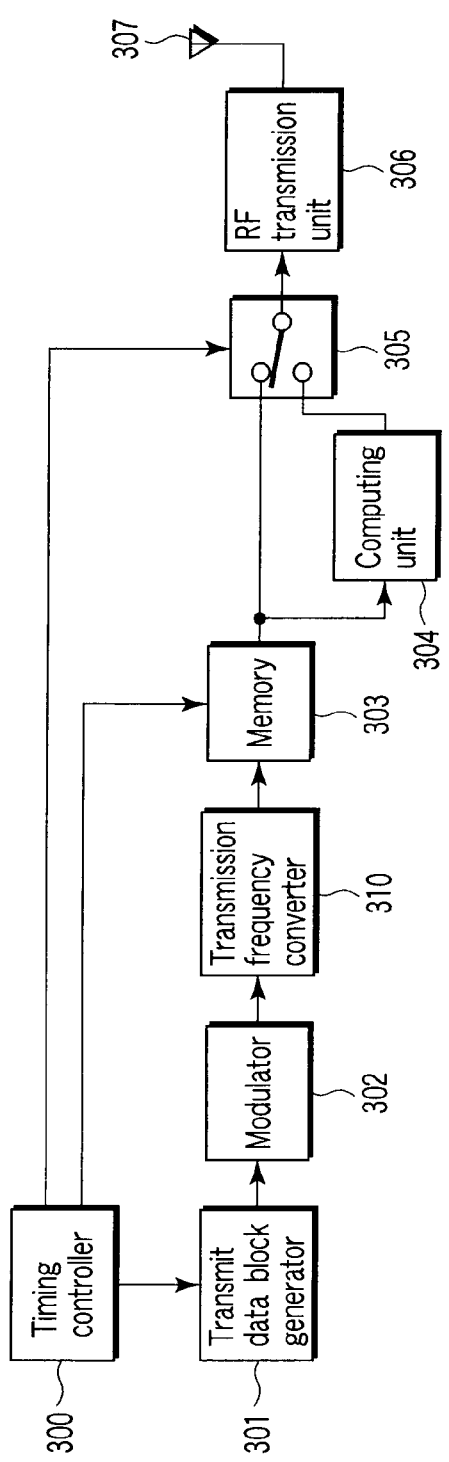
FIG. 13 is a block diagram illustrating a transmitter according to a second embodiment.

The transmitter 201 according to a second embodiment of the present invention will be explained using FIG. 13. The transmitter illustrated in FIG. 13 has a transmission frequency converter 310 added to the transmitter 201 shown in FIG. 9.

The transmission frequency converter 310 generates the first transmit baseband signal by converting the frequency of the modulation signal output from the modulator 302. Here, as an example, the modulation signal is assumed as being converted into a signal of center frequency $f_3$. The first transmit baseband signal having undergone frequency modulation is output to the memory 303. The units other than the transmission frequency converter 310 in FIG. 13 are the same as the first embodiment. Further, it is assumed that the computing unit 304 performs the complex conjugate computation. However, as mentioned earlier, it does not necessarily have to be a complex conjugate computation. Therefore, other computations mentioned in the first embodiment can also be used.

Receiver of the Second Embodiment

Figure 14:
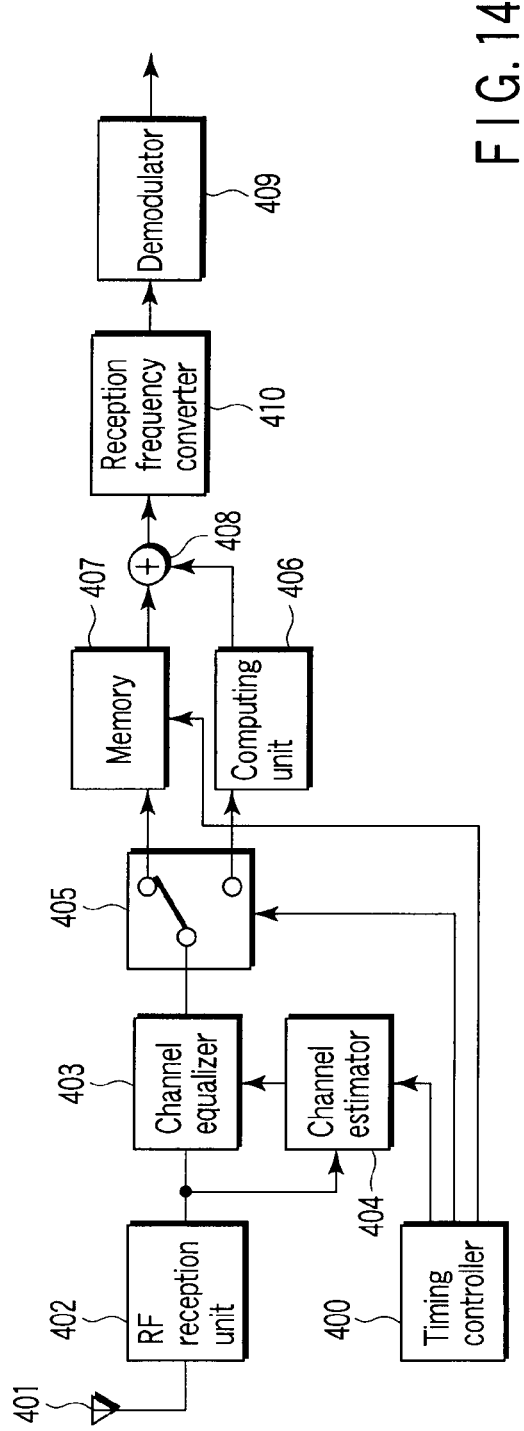
FIG. 14 is a block diagram illustrating a receiver according to the second embodiment.

FIG. 14 shows the receiver 205 according to the second embodiment of the present invention, in which a reception frequency converter 410 is added to the receiver 205 shown in FIG. 10. The units other than the frequency converter 410 in FIG. 14 are the same as the first embodiment. It is assumed that the computing unit 406 performs a complex conjugate computation. However, as mentioned earlier, it does not necessarily have to be the complex conjugate computation. Therefore, other computations mentioned in the first embodiment can also be used.

In the reception frequency converter 410, the combined baseband signal from the combiner 408 is subject to frequency conversion to generate a converted baseband signal. The frequency conversion shifts the frequency in a certain amount (referred to as frequency shift amount) to a certain direction (referred to as frequency shift direction). The frequency shift amount in the reception frequency converter 410 is a value obtained by multiplying the frequency shift amount in the transmission frequency converter 310 of the transmitter 201 shown in FIG. 13 by a minus. In other words, the frequency shift amount in the reception frequency converter 410 is identical to the frequency shift amount in the transmission frequency converter 310, but is in the opposite frequency shift direction. For example, in the case where the frequency conversion shift in the transmission frequency converter 310 is $f_3$ (the frequency shift amount is $f_3$, and the frequency shift direction is positive), the frequency shift at the time of transmission can be compensated by setting the frequency shift in the reception frequency converter 410 as $-f_3$ (the frequency shift amount is $f_3$, and the frequency shift direction is negative).

The process according to the second embodiment will be explained using FIGS. 15 (A), (B), (C), (D), (E) and (F). Here, as explained in FIG. 12 (A) to (F), the upconvert from the baseband frequency to the RF frequency by the RF transmission unit 306 and the downconvert from the RF frequency to the baseband frequency by the RF reception unit 402 are omitted. Further, the channel response in FIG. 15 (A) only illustrates the frequency band around the carrier frequency $f_c$. The carrier frequency $f_c$ corresponds to DC in the baseband signal. Furthermore, in FIG. 15 (A) to (F), $FB_{lowSNR}$ indicates a low SNR frequency band in which the received power decreases as explained in FIG. 5.

The channel 203 is assumed to have a characteristic in which the received power drops in frequency $f_1+f_c$ and frequency $f_c-f_2$ as shown in the channel response of FIG. 15 (A). In this case, the SNR of the RF signal of frequencies $f_c+f_1$ and $f_c-f_2$ (signals of frequencies f1 and −f2 in the baseband) decreases. FIGS. 15 (B), (C), (D), (E) and (F) indicate the power spectrum of each baseband signal.

Since the first transmit baseband signal is subject to the frequency conversion of frequency $f_3$, as shown in FIG. 15 (B), the center frequency of the spectrum of the first transmit baseband signal is in frequency $f_3$. The spectrum of the first transmit baseband signal includes a component of frequency $-f_2$. Meanwhile, the second transmit baseband signal is a signal obtained by subjecting the first transmit baseband signal to the complex conjugate computation. Therefore, the spectrum of the second transmit baseband signal becomes axisymmetric with respect to the spectrum of the first transmit baseband signal by the center DC, and its center frequency becomes $-f_3$, as shown in FIG. 15 (C). In this manner, the center frequency of the first transmit RF signal and the second transmit RF signal can be varied easily by using the complex conjugate computation. Thus, the frequency diversity effect can be obtained.

The first and second transmit baseband signals are transmitted respectively from the transmitter 201 as the first and second transmit RF signals at a different time via the channel 203. The first and second transmit RF signals are received as the first and second received RF signals by the receiver 205 via the channel 203. The first transmit baseband signal corresponding to the first received RF signal has a spectrum centering on the frequency $f_3$ as shown in FIG. 15 (D). The spectrum of the first received baseband signal includes a component of frequency $-f_2$, which is a low SNR. Meanwhile, the second received baseband signal which corresponds to the second received RF signal has a spectrum centering on frequency $-f_3$ as shown in FIG. 15 (E). Therefore, it does not include a component of frequency $-f_2$, which is low SNR, but has a relatively high SNR overall.

In the receiver 205, the center frequency can be restored to $f_3$ by subjecting the second received baseband signal to the complex conjugate computation, and the inversed spectrum is also recovered. Accordingly, by combining the first received baseband signal and the second received baseband signal having undergone the complex conjugate computation, at the combiner 408, the low SNR component of the first received baseband signal can be restored, and the error at the time of demodulation can be reduced.

In this manner, according to the second embodiment, the frequency diversity effect can be obtained in addition to the time diversity effect by simply adding a very easy computation, such as the complex conjugate computation, likewise in the first embodiment. Further, in the second embodiment, the frequencies of the first transmit RF signal and the second transmit RF signal are widely separated by combining the frequency conversions. Thus, a further effective frequency diversity effect can be obtained. Furthermore, in the second embodiment, since only the first transmit baseband signal is subject to the frequency conversion, the computation amount significantly decreases in comparison to the case in which the two transmit baseband signals are subject to frequency conversion.

The advantages of the second embodiment will be explained in detail. According to the conventional art, such as in Document 1, frequency conversion must be performed twice in order to generate the first and second transmit RF signals which have different center frequencies. As mentioned earlier, since the computation amount for frequency conversion is large, the required circuit size becomes larger. Further, to perform such frequency conversion for each transmission causes the consumption power to increase. As for the receiving end, it is necessary to generate the received baseband signal by subjecting the first and second received RF signals having different center frequencies to the frequency conversion in different frequency shift amounts.

Meanwhile, according to the second embodiment, the frequency conversion performed in the transmitter 201 is required only on the first transmit baseband signal. The second transmit baseband signal can be generated by subjecting the first transmit baseband signal to the complex conjugate computation, such as by simply inversing the symbol of the imaginary number component. The frequency conversion is not required. The frequency conversion performed in the receiver 205 is required to be performed only on the combined received baseband signal obtained from the combiner 408.

(Frequency Arrangement of the Transmit RF Signal)

Figure 16:
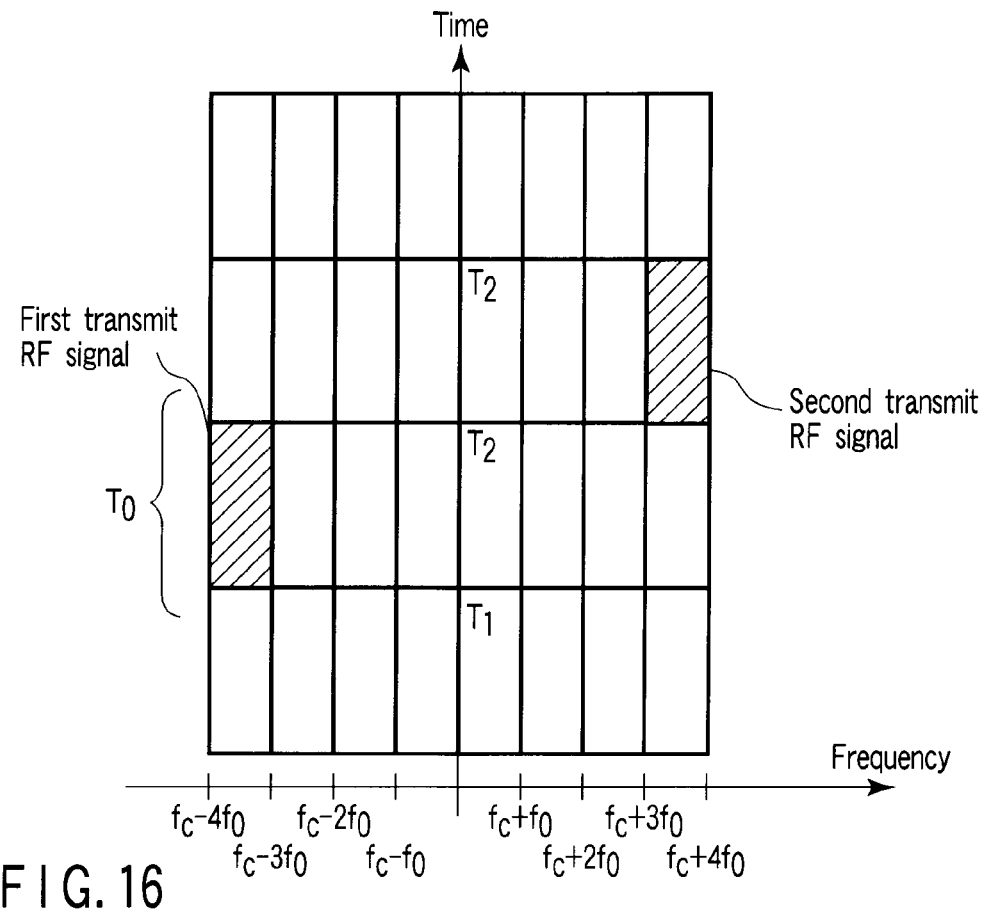
FIG. 16 illustrates an example of a frequency arrangement of the first and second transmit RF signals

A preferred frequency arrangement of the first and second transmit RF signals will be explained with reference to FIG. 16. A transmittable frequency band of the transmitter 201 is assumed as being restricted between $f_c-4f_0$ and $f_c+4f_0$ (bandwidth is $8f_0$) as shown in FIG. 16. The transmittable frequency band is divided into 8 subbands, and the bandwidth of the transmit RF signal from the transmitter 201 is assumed to be $f_0$. The transmission time of the transmit RF signal is assumed to be $T_0$.

As shown in FIG. 16, the first transmit RF signal and the second transmit RF signal are arranged on both ends of the transmittable frequency band. In other words, the center frequency of the first transmit RF signal is set as $f_c-3.5f_0$ and the center frequency of the second transmit RF signal is set as $f_c+3.5f_0$. By doing so, the frequency interval of the first transmit RF signal and the second transmit RF signal can be maximized. Thus, channel distortions of the first and second transmit RF signals undergone on the channel 203 become almost uncorrelated, thereby maximizing the frequency diversity effect.

At this time, the second transmit baseband signal is generated in accordance with the second embodiment. In other words, the first transmit baseband signal is generated, then, the second transmit baseband signal is generated by subjecting the first transmit baseband signal to the complex conjugate computation. In the example of FIG. 16, the second transmit RF signal is transmitted with no time interval after the first transmit RF signal is transmitted. However, it is also fine to transmit the second RF signal with a certain time interval after the transmission of the first transmit RF signal.

(Application Example to DFT-s-OFDMA)

Figure 17:
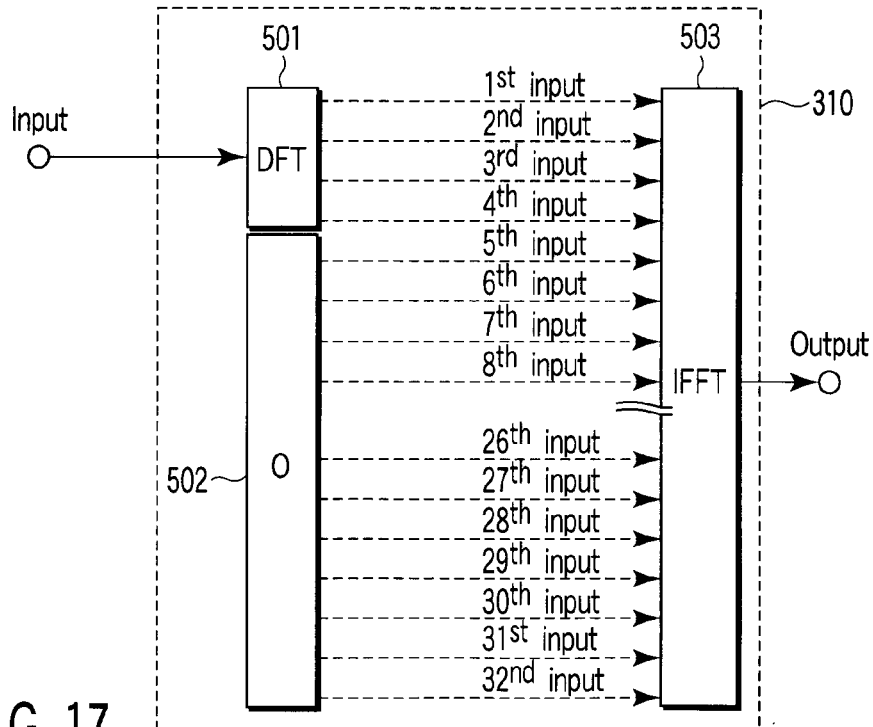
FIG. 17 is a block diagram illustrating a specific example of a transmission frequency converter in FIG. 13.

A preferred example of the transmission frequency converter 310 will be explained using FIG. 17. FIG. 17 shows a frequency conversion and sample rate conversion device used in a communication scheme referred to as DFT-s-OFDMA. DFT represents a discrete Fourier transform, s represents spread, and OFDMA represents an Orthogonal Frequency Division Multiple Access. In the case of transmitting the first and second transmit RF signals in accordance with the frequency arrangement shown in FIG. 16, when generating the first transmit RF signal in the transmitter 201, the frequency converter 310 is required to subject the first transmit baseband signal generated by the converter 302 to frequency conversion to obtain a signal with a center frequency $-3.5f_0$.

In the transmission frequency converter 310 of FIG. 17, the output of the modulator 302 is first input to a DFT (discrete Fourier transform) unit 501, which is the first converter. As the output of the DFT unit 501, a signal spectrum of a frequency domain is obtained. Here, as an example, the DFT size in the DFT unit 501 is 4.

A first signal spectrum obtained by the DFT unit 501 has its center frequency converted by an IFFT (inverse fast Fourier transform) unit 503, which is the second converter. It is then converted into a time wave, in order to generate the first transmit baseband signal. The signal spectrum obtained by the DFT unit 501 is input to the first to fourth input ports corresponding to, for example, the frequencies from $-4f_0$ to $-3f_0$ of the IFFT unit 503. A 0 value occurrence unit 503 inputs "0" to the other fifth to the $32^{nd}$ input ports of the IFFT unit.

In other words, the IFFT size in the example of FIG. 17 is 32. Therefore, in order to have this correspond to the frequencies from $-4f_0$ to $4f_0$, the first to fourth input ports become the input ports corresponding to the frequencies from $-4f_0$ to $-3f_0$. When observing the output of the IFFT unit 503 by a sample rate $4f_0$, the first transmit baseband signal in which the time wave is converted into a center frequency $-3.5f_0$ is obtained.

In the case of arranging the transmission frequency converter 310 likewise FIG. 17, the DFT unit 501 and the IFFT unit 503 need to be operated only when generating the first transmit RF signal. In contrast to Document 1, in which the DFT unit and the IFFT unit are required to be operated when generating the first and second transmit RF signals, the consumption power can be reduced to almost half by operating the DFT unit 501 and the IFFT unit 503 only when generating the first transmit RF signal.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A radio communication method comprising:
    generating a first transmit RF signal and a second transmit RF signal from a data signal to be transmitted, the first transmit RF signal and the second transmit RF signal respectively having a power spectrum in symmetric shape in the frequency domain;
    transmitting the first transmit RF signal and the second transmit RF signal at a different time from a single transmit antenna;
    receiving the first transmit RF signal and the second transmit RF signal to generate a first received RF signal and a second received RF signal; and reproducing the data signal only from the first received RF signal and the second received RF signal, wherein the generating the first transmit RF signal and the second transmit RF signal comprises:

modulating the data signal to generate a first transmit baseband signal which has a first power spectrum;

subjecting the first transmit baseband signal to a first computation to generate a second transmit baseband signal which has a power spectrum forming a symmetric shape with respect to the first power spectrum in the frequency domain; and subjecting the first transmit baseband signal and the second transmit baseband signal to an RF process to generate the first transmit RF signal and the second transmit RF signal.

2. A transmission apparatus comprising:

a transmitter configured to generate a first transmit RF signal and a second transmit RF signal from a data signal to be transmitted, and to output them at a different time, the first transmit RF signal and the second transmit RF signal respectively having a power spectrum in a symmetric shape in the frequency domain; and a single transmit antenna to transmit the first transmit RF signal and the second transmit RF signal, wherein the transmitter comprises:

a modulator configured to modulate the data signal to generate a first transmit baseband signal which has a first power spectrum;

a first computing unit configured to subject the first transmit baseband signal to a first computation to generate a second transmit baseband signal which has a power spectrum forming a symmetric shape with respect to the first power spectrum in the frequency domain; and an RF transmission unit configured to subject the first transmit baseband signal and the second transmit baseband signal to an RF process to generate the first transmit RF signal and the second transmit RF signal, wherein the data signal is reproduced only from the first RF signal and the second RF signal in a receiver.

3. The transmission apparatus according to claim 2, wherein the first transmit RF signal and the second transmit RF signal have different center frequencies.

4. The transmission apparatus according to claim 2, wherein, the first transmit RF signal has a transmittable lowest frequency, and the second transmit RF signal has a transmittable highest frequency.

5. The transmission apparatus according to claim 2, wherein, the first transmit baseband signal is a complex number signal having a real part and an imaginary part, and the first computation is done by multiplying either one of the real part and the imaginary part by −1.

6. The transmission apparatus according to claim 2, wherein, the first transmit baseband signal is a complex number signal having a real part and an imaginary part, and the first computation replaces the real part with the imaginary part.

7. A radio receiving apparatus comprising:

a receive antenna configured to receive the first transmit RF signal and the second transmit RF signal transmitted from the transmission apparatus according to claim 2 to obtain a first received RF signal and a second received RF signal;

an RF reception unit configured to subject the first received RF signal and the second received RF signal to an RF process to generate a first received baseband signal and a second received baseband signal;

a channel equalizer configured to subject the first received baseband signal and the second received baseband signal to channel equalization to obtain a first equalized baseband signal and a second equalized baseband signal;

a second computing unit configured to subject the second equalized baseband signal to a second computation;

a combiner configured to combine the second equalized baseband signal which has undergone the second computation and the first equalized baseband signal to obtain a combined baseband signal; and a demodulator configured to demodulate the combined baseband signal to reproduce the data signal.

8. A transmission apparatus comprising:

a transmitter configured to generate a first transmit RF signal and a second transmit RF signal from a data signal to be transmitted, and to output them at a different time, the first transmit RF signal and the second transmit RF signal respectively having a power spectrum in a symmetric shape in the frequency domain; and a single transmit antenna to transmit the first transmit RF signal and the second transmit RF signal, wherein the transmitter comprises:

a modulator configured to modulate the data signal to generate a modulated signal;

a first frequency converter configured to subject the modulated signal to a frequency conversion in a first frequency shift amount and a first frequency shift direction to generate a first transmit baseband signal;

a first computing unit configured to subject the first transmit baseband signal to a first computation to generate a second transmit baseband signal which has a power spectrum forming a symmetric shape with respect to the power spectrum in the frequency domain; and an RF transmission unit configured to subject the first transmit baseband signal and the second transmit baseband signal to an RF process to generate the first transmit RF signal and the second transmit RF signal, wherein the data signal is reproduced only from the first RF signal and the second RF signal in a receiver.

9. The transmission apparatus according to claim 8, wherein, the first transmit baseband signal is a complex number signal having a real part and an imaginary part, and the first computation multiplies either one of the real part and the imaginary part by −1.

10. The transmission apparatus according to claim 8, wherein, the first transmit baseband signal is a complex number signal having a real part and an imaginary part, and the first computation replaces the real part with the imaginary part.

11. The transmission apparatus according to claim 8, wherein the frequency converter comprises:

a first converter configured to convert the modulated signal into a first signal spectrum in a frequency domain; and a second converter configured to convert a center frequency of the first signal spectrum and convert it into a time wave to generate the first transmit baseband signal.

12. The transmission apparatus according to claim 11, wherein, the first converter is a DFT unit, and the second converter is an IFFT unit.

13. A radio receiving apparatus comprising:

a receive antenna configured to receive the first transmit RF signal and the second transmit RF signal transmitted from the transmission apparatus according to claim 8 to obtain a first received RF signal and a second received RF signal;

an RF reception unit configured to subject the first received RF signal and the second received RF signal to an RF process to generate a first received baseband signal and a second received baseband signal;

a channel equalizer configured to subject the first received baseband signal and the second received baseband signal to channel equalization to obtain a first equalized baseband signal and a second equalized baseband signal;

a second computing unit configured to subject the second equalized baseband signal to a second computation;

a combiner configured to combine the second equalized baseband signal which has undergone the second computation and the first equalized baseband signal to obtain a combined baseband signal;

a second frequency converter configured to subject the combined baseband signal to a frequency conversion in the first frequency shift amount and a second frequency shift direction which is the opposite of the first frequency shift direction to generate a converted baseband signal; and a demodulator configured to demodulate the converted baseband signal to reproduce the data signal.

* * * * *